United States Patent
Karri et al.

(10) Patent No.: US 11,822,941 B2
(45) Date of Patent: Nov. 21, 2023

(54) MOBILE COMPUTING DEVICE PROJECTED VISUALIZATION INTERACTION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN); Poorna Vadada, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/488,431

(22) Filed: Aug. 28, 2023

(65) Prior Publication Data

US 2023/0103022 A1    Mar. 30, 2023

(51) Int. Cl.
*G06F 9/451* (2018.01)
*G06F 3/04817* (2022.01)
(Continued)

(52) U.S. Cl.
CPC ............. *G06F 9/451* (2018.02); *G02B 30/56* (2020.01); *G06F 3/0488* (2013.01);
(Continued)

(58) Field of Classification Search
None
See application file for complete search history.

(56) References Cited

U.S. PATENT DOCUMENTS 8,519,971 B1 * 8/2013 Mackraz ............. G06F 3/04886
715/702
8,782,538 B1 * 7/2014 Skare ................. G06F 16/3322
715/780
(Continued)

FOREIGN PATENT DOCUMENTS

CN     112333474 A     2/2021
WO    2021004489 A1    1/2021

OTHER PUBLICATIONS

"Method and system for interaction with physical and midair projected contents," IP.Com, An IP.com Prior Art Database Technical Disclosure, IP.com No. IPCOM000256422D, 6 pages https://priorart.ip.com/IPCOM/000256422.
(Continued)

*Primary Examiner* — Ryan Barrett
(74) *Attorney, Agent, or Firm* — Mark Bergner (57) ABSTRACT

A current state of a mobile computing device may be monitored. The mobile computing device has a set of one or more installed applications. The current state is related to the set of installed applications. A first computing action of a user of the mobile computing device is identified responsive to the current state. The first computing action is related to the set of installed applications. Responsive to the first computing action, a set of one or more candidate computing actions is determined. The mobile computing device generates, based on the first computing action, a projected visualization that relates to a first candidate computing action of the set of candidate computing actions.

16 Claims, 6 Drawing Sheets

(51) Int. Cl.
*G06N 20/00* (2019.01)
*G06F 3/0488* (2022.01)
*G02B 30/56* (2020.01)
*G06F 3/044* (2006.01)

(52) U.S. Cl.
CPC ......... *G06F 3/04817* (2013.01); *G06N 20/00* (2019.01); *G06F 3/044* (2013.01)

(56) References Cited

U.S. PATENT DOCUMENTS

| | | | | |
|---|---|---|---|---|
| 8,988,356 | B2 | 3/2015 | Tseng | |
| 10,203,812 | B2 | 2/2019 | Katz | |
| 10,275,098 | B1 | 4/2019 | Clements | |
| 2008/0052639 | A1* | 2/2008 | Chun | G06F 16/9537 715/810 |
| 2008/0222569 | A1* | 9/2008 | Champion | G06F 3/0482 715/834 |
| 2008/0263024 | A1* | 10/2008 | Landschaft | G06F 16/9537 707/999.005 |
| 2012/0032979 | A1* | 2/2012 | Blow | G06F 1/1626 345/173 |
| 2012/0124509 | A1* | 5/2012 | Matsuda | G06T 19/20 715/782 |
| 2012/0324381 | A1* | 12/2012 | Cohen | G06F 3/04886 715/765 |
| 2013/0024815 | A1* | 1/2013 | O | H04M 1/72472 715/811 |
| 2013/0290876 | A1* | 10/2013 | Anderson | G06T 19/006 715/761 |
| 2014/0108978 | A1* | 4/2014 | Yu | G06F 3/0482 715/765 |
| 2014/0372943 | A1* | 12/2014 | Kroupa | G06F 3/0482 715/808 |
| 2016/0202873 | A1 | 7/2016 | Chi et al. | |
| 2018/0348705 | A1* | 12/2018 | Rakshit | G02B 26/004 |

OTHER PUBLICATIONS

"Navigating the Windows Mixed Reality home," Microsoft Docs, Mar. 21, 2018, 7 pages https://docs.microsoft.com/en-us/windows/mixed-reality/discover/navigating-the-windows-mixed-reality-home.

"Method and system for midair projection display," IP.Com, Prior Art Database, Aug. 2, 2017, 3 pages https://priorart.ip.com/IPCOM/000250548.

* cited by examiner

MOBILE COMPUTING DEVICE PROJECTED VISUALIZATION INTERACTION

BACKGROUND

The present disclosure relates to mobile computing, and more specifically, to providing user interfaces to mobile computing devices.

Mobile computing devices may be used by users to perform all sorts of computing actions. Mobile computing devices may operate with a screen and integrated input device, such as a touch screen or relatively small integrated keyboard. The size of a mobile computing device may limit the size of the integrated screen.

SUMMARY

According to embodiments, disclosed are a method, system, and computer program product.

A current state of a mobile computing device may be monitored. The mobile computing device has a set of one or more installed applications. The current state is related to the set of installed applications. A first computing action of a user of the mobile computing device is identified responsive to the current state. The first computing action is related to the set of installed applications. Responsive to the first computing action, a set of one or more candidate computing actions is determined. The mobile computing device generates, based on the first computing action, a projected visualization that relates to a first candidate computing action of the set of candidate computing actions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to mobile computing; more particular aspects relate to providing user interfaces to mobile computing devices. While the present disclosure is not necessarily limited to such applications, various aspects of the disclosure may be appreciated through a discussion of various examples using this context.

Computing devices have increased in popularity and common usage due to a variety of factors. For instance, microprocessors, memory circuits, and display hardware have become cheaper and more easily obtainable. The reduced cost and increased availability of hardware components have led to additional computing form factors. One popular computing platform is that of a mobile computing device. A mobile computing device may be a computer that is designed around or puts a high degree of importance on light weight and smaller size. Many mobile computing devices may allow for users to use computers in places that they normally may not. In one example, a user may take with them a tablet computer during a plane trip or while camping. In another example, a user may take a smartphone with them everywhere they go. In some instances, mobile computing devices have become the only source of computing for users despite various compromises. For example, a user may now select to use only a laptop computer instead of a desktop computer that has more memory or is capable of performing increased processing.

Many more use cases for computers have come about recently. With the increased availability of and performance of computing capabilities, many more use cases of computers have come about for mobile computing devices. For example, many users now perform routine tasks such as paying bills, looking up directions, and creating art with mobile computing devices. These use cases may leverage a user interface, such as a graphical user interface ("GUI"), to interact with a computer. These user interfaces may be more complex or expansive as more complex use cases come about on computers. For example, a user may perform complex mathematical or spreadsheet tasks on a computer due to the processing power afforded by the computer. In another example, a user may utilize a computer-generated map because the data in the map may be more often updated than a paper map.

Mobile computing devices may have drawbacks related to the GUI. Specifically, a mobile computing device by its nature may be constructed around a relatively small display. For example, a user may choose a first device that has a relatively small 6-inch touch screen over a larger-screened second device as the first device is more portable. The small screen may limit the amount of information or productivity of the user of the mobile computing device. For example, a user might choose to interact with multiple software applications (alternatively, "apps") on a mobile computing device simultaneously in a travel context of a trip. During the trip, the user may be looking up the translation for certain words or phrases in a translation app and may also have a mapping app open to navigate to various locations. By choosing to simultaneously display multiple apps on the screen, the user sacrifices screen area for each app, and each app operates with a diminished view. Stated another way, the screen size of the mobile computing device may only be able to simultaneously display mobile apps with reduced or compromised content (e.g., smaller images, less detailed renderings, partial views) and user-interaction elements (e.g., fewer buttons, less widgets, cumbersome sliders) that each of the two apps are able to present to the user. In another example, a user may be trying to read information from a web browser and transcribe that information into a text editor. The small relative size of a mobile computing device may lead to a situation where a user switches between the web browser and text editor, leading to missing certain information or being slow at transcribing.

Mobile computing devices may attempt to solve this in a variety of ways, but each of these attempts have some drawbacks. Making the screen of the mobile computing device bigger may facilitate viewing and using apps with more information, but the increased screen size makes the devices difficult to use. For example, a large smartphone is harder to grip and use one-handed or to fit in a pocket. Plugging the mobile computing device into an external monitor may be useful for display more information, but the external monitor is not always feasible. For example, an external monitor may only be useful when the user brings the external monitor to wherever the user intends to perform computing. Accessory devices (e.g., wearable augmented reality glasses, smart watches) may facilitate displaying of additional information to a user but have multiple drawbacks. First, accessory devices may be expensive; second, they may not have interoperability with the mobile computing device; and third, they may be complicated to use. A user may attempt to work around a limited screen size with the use of a voice-based user interface. A voice-based user interfaces may not be helpful or impractical in all situations. For example, a mobile computing device that includes a voice-based user interfaces may not be able to fully describe information presented to a user. Further, voice-based user interfaces may be disruptive to other nearby users, or may not be practical in environments with outside noises (e.g., a factory, a mining operation).

A mobile computing device ("MCD") projected visualization interaction (PVI) may provide additional visual information to a user of the MCD. The PVI may operate by generating a projected visualization of one or more user interface elements in an area around an MCD. For example, the PVI may include a light source to project an image into the area that is near the MCD.

The projected visualization of the PVI may be based on a volumetric display technology. The volumetric display technology may include a device configured to generate a mid-air volumetric display. The mid-air volumetric display may be configured to project into a three-dimensional space of one or more particles. The mid-air volumetric display may generate a volumetric visualization by the use of a plurality of volumetric sources. These volumetric sources may be diodes, lasers, plasma-generators, or other relevant technology. The volumetric display technology may be configured to render onto a field of particles the projected image. For example, an MCD may be located in an area with dusk, smoke, fog, pollen, or other mostly transparent particulate matter. The particulate matter may be regularly dispersed. Specifically, each particle of the particulate matter may be evenly or mostly-evenly distributed throughout the field, region, or area where the MCD is located. The MCD may project onto the particulate matter an image that may be viewable by a user. The volumetric display technology may be based on any technology configured to generate an image separate from or distal from a body or outer surface of a MCD, such as a visible-light projector, holographic display, or other relevant projection technology.

In some embodiments, the volumetric display technology of the PVI may be configured to provide or generate a mid-air volumetric image based on a plurality of volumetric sources, such as in an environment with relatively few particulates (e.g., in-doors, in a clear area). Specifically, a first volumetric source may be considered a guiding source. For instance, a first laser of a mid-air volumetric display may be configured to trap, tweeze, adjust, or otherwise manipulate a particle in a three-dimension real-world space. For example, a particle may be moved around in a room of a home into a plurality of positions (e.g., along a path). The guiding source may be configured to push, pull, guide, trace, control or otherwise move the particle along a pre-set or pre-determined path in the three-dimensional space.

A second volumetric source of the mid-air volumetric display may be considered a rendering source. The rendering source may be configured to paint, color, illuminate, render, or otherwise interact with the particle such that the particle is visible to a user. Specifically, the second volumetric source may be a visible-light laser that creates a beam of visible-light. The second volumetric source may be directed or aimed at the particle as it travels along or is guided on the pre-set or pre-determined path. The second volumetric source may project or direct the visible light (e.g., reg, green, blue) onto the particle, causing the particle to emit light in all directions as it moves along the path by the first volumetric source.

Consequently, based on the movement of the particle by the guiding source and the illumination of the particle by the rendering source, a volumetric visualization may be created by the mid-air volumetric display. For example, a guiding source may trace a path in a three-dimensional space of an automotive fastener and the rendering source may illuminate the path, such that, in mid-air, a three-dimensional image (e.g., a volumetric visualization) of the automotive fastener is viewable by a viewer. This volumetric visualization may be viewed from any side (including a top or bottom side) and may be projected into a position located in three-dimensional space that is useful to the viewer, such as just above a physical automobile part that is configured to accept automotive fasteners. This may lead to practical advantages, such as a user more intuitively understanding the relationship between components.

The PVI may operate to provide a project interface and facilitate interaction with multiple apps simultaneously. For example, while interacting with any mobile app, if the mobile device determines the user intends to interact with additional one or more mobile apps along with the current opened mobile app, then mobile device will be using the projected display capability to create candidate mobile app icons in mid-air. In some embodiments, the PVI may operate based on determining the user intends to interact with additional apps in combination with the currently opened mobile app, then the mobile device will create the additional mobile apps in mid-air.

The PVI may operate without disturbing the current tasks of the user, which may increase the productivity of the user. Specifically, the PVI may facilitate operation of a first app on the screen of the MCD while additional apps may be projected into nearby mid-air. The mid-air location of the additional apps and user interfaces may prevent any kind of interference with a view, gaze, or perspective of a user of the currently in-use app that is displayed on a screen of the MCD. Specifically, the PVI may render additional GUI elements as a projected visualization that does not block, obscure, or otherwise interfere by not intersecting with or interrupting a path between the eyes of a user and the screen.

Figure 1:
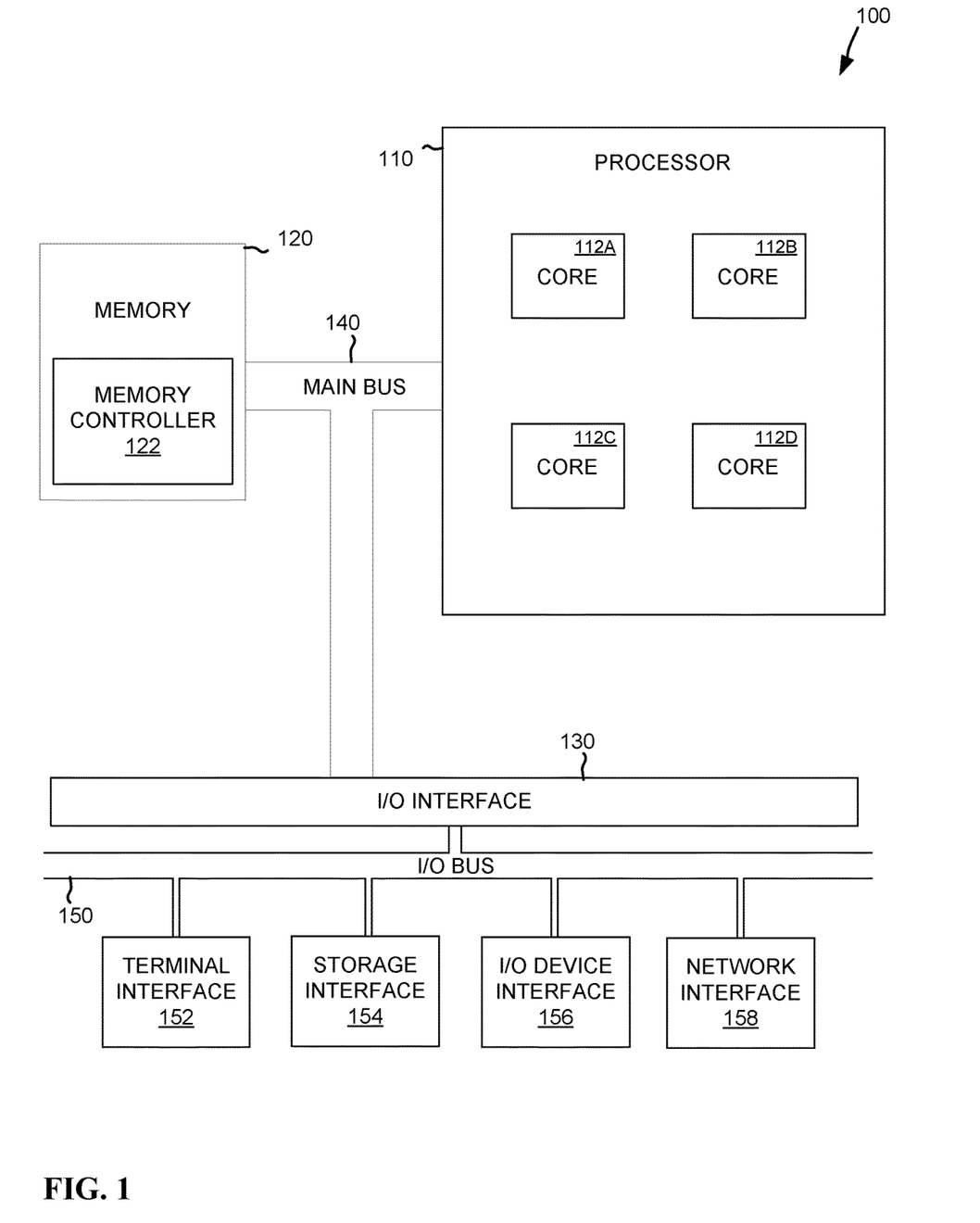
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively, 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100— including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
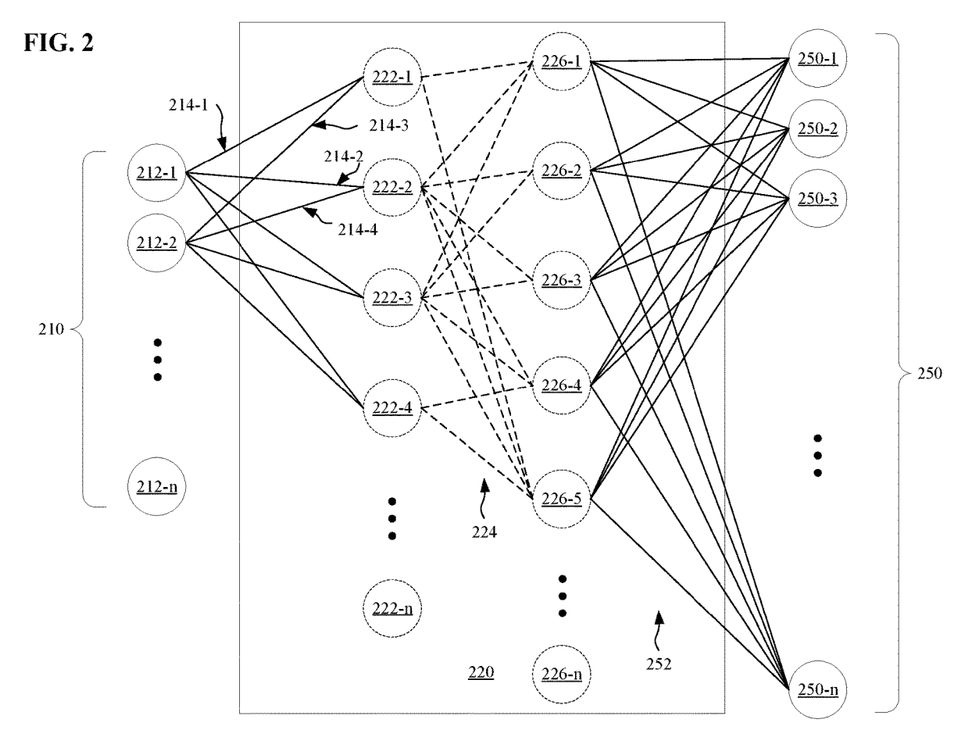
FIG. 2 depicts an example neural network representative of one or more artificial neural networks capable of performing machine learning for projected visualization interaction ("PVI") consistent with some embodiments of the present disclosure.

FIG. 2 depicts an example neural network (alternatively, "network") 200 representative of one or more artificial neural networks capable performing machine learning for PVI, consistent with some embodiments of the present disclosure. The neural network 200 is made up of a plurality of layers. The network 200 includes an input layer 210, a hidden section 220, and an output layer 250. Though network 200 depicts a feed-forward neural network, it should be appreciated that other neural networks layouts may also be configured to perform PVI such as a recurrent neural network layout (not depicted). In some embodiments, the network 200 may be a design-and-run neural network and the layout depicted may be created by a computer programmer. In some embodiments, the network 200 may be a design-by-run neural network, and the layout depicted may be generated by the input of data and by the process of analyzing that data according to one or more defined heuristics. The network 200 may operate in a forward propagation by receiving an input and outputting a result of the input. The network 200 may adjust the values of various components of the neural network by a backward propagation (back propagation).

The input layer 210 includes a series of input neurons 212-1, 212-2, up to 212-$n$ (collectively, 212) and a series of input connections 214-1, 214-2, 214-3, 214-4, etc. (collectively, 214). The input layer 210 represents the input from data that the neural network is supposed to analyze (e.g., data of previous locations, application usage, and application placement and arrangement of a user of a mobile computing device). Each input neuron 212 may represent a subset of the input data. For example, the neural network 200 is provided with a list of applications that are used on a mobile computing device as input, and the list of applications is represented by a series of unique identifiers.

In another example, input neuron 212-1 may be the first pixel of a picture, input neuron 212-2 may be the second pixel of the picture, etc. The number of input neurons 212 may correspond to the size of the input. For example, when neural network 200 is designed to analyze images that are 256 pixels by 256 pixels, the neural network layout may include a series of 65,536 input neurons. The number of input neurons 212 may correspond to the type of input. For example when the input is a color image that is 256 pixels by 256 pixels, the neural network layout may include a series of 196,608 input neurons (65,536 input neurons for the red values of each pixel, 65,536 input neurons for the green values of each pixel, and 65,536 input neurons for the blue values of each pixel). The type of input neurons 212 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, a neural network may be designed to analyze images that are color, and each of the input neurons may be a three dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 214 represent the output of the input neurons 212 to the hidden section 220. Each of the input connections 214 varies depending on the value of each input neuron 212 and based upon a plurality of weights (not depicted). For example, the first input connection 214-1 has a value that is provided to the hidden section 220 based on the input neuron 212-1 and a first weight. Continuing the example, the second input connection 214-2 has a value that is provided to the hidden section 220 based on the input neuron 212-1 and a second weight. Further continuing the example, the third input connection 214-3 provides a value based on the input neuron 212-2 and a third weight, etc. Alternatively stated, the input connections 214-1 and 214-2 share the same output component of input neuron 212-1 and the input connections 214-3 and 214-4 share the same output component of input neuron 212-2; all four input connections 214-1, 214-2, 214-3, and 214-4 may have output components of four different weights. Though the network neural 200 may have different weightings for each connection 214, some embodiments may contemplate weights that are similar. In some embodiments, each of the values of the input neurons 212 and the connections 214 may necessarily be stored in memory.

The hidden section 220 includes one or more layers that receive inputs and produce outputs. The hidden section 220 includes a first hidden layer of calculation neurons 222-1, 222-2, 222-3, 222-4, up to 222-$n$ (collectively, 222); a second hidden layer of calculation neurons 226-1, 226-2, 226-3, 226-4, 226-5, up to 226-$n$ (collectively 226); and a series of hidden connections 224 coupling the first hidden layer and the second hidden layer. It should be appreciated that neural network 200 only depicts one of many neural networks capable of PVI operations consistent with some embodiments of the disclosure. Consequently, the hidden section 220 may be configured with more or fewer hidden layers (e.g., one hidden layer, seven hidden layers, twelve hidden layers, etc.)—two hidden layers are depicted for example purposes.

Each calculation neuron 222 of the first hidden layer may receive as input a value provided by one or more of the connections 214. For example, calculation neuron 222-1 receives values provided by input connection 214-1 and input connection 214-2. Each calculation neuron 222 of the first hidden layer also provides an output. The output is represented by the dotted lines of hidden connections 224 flowing out of the calculation neurons 222 of the first hidden layer. Each of the calculation neurons 222 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed in the performance of the activation function (e.g., a sigmoid neurons or other logistic functions, tan h neurons, softplus functions, softmax functions, rectified linear units, etc.). In some embodiments, each of the calculation neurons 222 also contains a bias (not depicted). The bias may be used to decide the likelihood or valuation of a given activation function. In some embodiments, each of the values of the biases for each of the calculation neurons must necessarily be stored in memory.

The neural network 200 may include the use of a sigmoid neuron for the activation function of calculation neuron 222-1. An equation (Equation 1, stated below) may represent the activation function of calculation neuron 222-1 as f(neuron). The logic of calculation neuron 222-1 may be the summation of each of the input connections that feed into calculation neuron 222-1 (i.e., input connection 214-1 and input connection 214-3) which are represented in Equation 1 as j. For each j the weight w is multiplied by the value x of the given connected input neuron 212. The bias of the calculation neuron 222-1 is represented as b. Once each input connection j is summed, the bias b is subtracted. Finalizing the operations of this example as follows: given a larger positive number of results from the summation and bias in activation f(neuron), the output of calculation neuron 222-1 approaches approximately 1; given a larger negative number of results from the summation and bias in activation f(neuron), the output of calculation neuron 222-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \qquad \text{Equation 1}$$

The second hidden layer includes the calculation neurons 226-1, 226-2, 226-3, 226-4, 226-5, up to 226-$n$. In some embodiments, the calculation neurons 226 of the second hidden layer may operate similarly to the calculation neurons 222 of the first hidden layer. For example, the calculation neurons 226-1 to 226-$n$ may each operate with a similar activation function as the calculation neurons 222-1 to 222-$n$. In some embodiments, the calculation neurons 226 of the second hidden layer may operate differently to the calculation neurons 222 of the first hidden layer. For example, the calculation neurons 226-1 to 226-$n$ may have a first activation function, and the calculation neurons 222-1 to 222-$n$ may have a second activation function.

Similarly, the connectivity to, from, and between the various layers of the hidden section 220 may also vary. For example, the input connections 214 may be fully connected to the calculation neurons 222 of the first hidden layer and hidden connections 224 may be fully connected from the calculation neurons 222 of the first hidden layer to the calculation neurons 226 of the second hidden layer. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 214 may not be fully connected to the calculation neurons 222 of the first hidden layer and the hidden connections 224 may not be fully connected from the calculation neurons 222 of the first hidden layer to the calculation neurons 226 of the second hidden layer.

Further, the parameters to, from, and between the various layers of the hidden section 220 may also vary. In some embodiments, the parameters may include the weights and the biases. In some embodiments, there may be more or fewer parameters than the weights and biases. For purposes of example, neural network 200 may be in the form of a convolutional neural network. The convolutional neural network may include a sequence of heterogeneous layers (e.g., an input layer 210, a convolution layer 222, a pooling layer 226, and an output layer 250). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases as well as additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer includes a series of output neurons 250-1, 250-2, 250-3, up-to 250-n (collectively, 250). The output layer holds a result of the analyzation of the neural network 200. In some embodiments, the output layer may be a categorization layer used to identify a feature of the input to the network 200. For example, the network 200 may be a classification network trained to identify Arabic numerals. In such an example, the network 200 may include ten output neurons 250 corresponding to which Arabic numeral the network has identified (e.g., output neuron 250-2 having a higher activation value than output neurons 250 may indicate the neural network determined an image contained the number '1'). In some embodiments, the output layer may be a real-value target (e.g., trying to predict a result when an input is a previous set of results) and there may be only a singular output neuron (not depicted). The output layer is fed from an output connection 252. The output connection 252 provides the activations from the hidden section 220. In some embodiments, the output connections 252 may include weights and the output neurons 250 may include biases.

Training the neural network depicted by neural network 200 may include performing back propagation. Back propagation is different from forward propagation. Forward propagation may include feeding of data into the input neurons 210; performing the calculations of the connections 214, 224, 252; and performing the calculations of the calculation neurons 222 and 226. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 200 by starting with the output neurons 250 and propagating the error backward through the various connections 252, 224, 214 and layers 226, 222, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation, the result or determination may be an incorrect determination. For example, neural network 200 may be a classification network; may be provided with a 128 pixel by 250 pixel image input that contains the number '3'; and may determine that the number is most likely '9' and is second most likely '2' and is third most likely '3' (and so on with the other Arabic numerals). Continuing the example, performing a back propagation may alter the values of the weights of connections 214, 224, and 252; and may alter the values of the biases of the first layer of calculation neurons 222, the second layer of calculation neurons 226, and the output neurons 250. Further continuing the example, the performance of the back propagation may yield a future result that is a more accurate classification of the same 128 pixel by 250 pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 200. The network 200 is provided a given number of training inputs n in a subset (or entirety) of training data that have input values x. The network 200 may yield output a from x and should yield a desired output y(x) from x. Back propagation or training of the network 200 should be a reduction or minimization of the objective function 'O(w,b)' via alteration of the set of weights and biases. Successful training of network 200 should not only include the reduction of the difference between the answer a and the correct answers y(x) for the input values x, but given new input values (e.g., from additional training data, from validation data, etc.).

$$O(w, b) \equiv \frac{1}{2n}\sum_{x}\|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 200 may be small in any given iteration. Back propagation algorithms may need to be repeated for many iterations to perform accurate learning as a result of the necessitated smallness of any given iteration.

For example, neural network 200 may have untrained weights and biases, and back propagation may involve the stochastic gradient descent to train the network over a subset of training inputs (e.g., a batch of ten training inputs from the entirety of the training inputs). Continuing the example, network 200 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 200 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

FIGS. 3A, 3B, 3C, 3D, and 3E depict a system 300 for projected visual interaction ("PVI"), consistent with some embodiments of the disclosure. Specifically, system 300 may be configured to monitor a mobile computing device and identify computing actions of a user. Responsive to identifying the computing actions of the user, system 300 may be configured to determine candidate computing actions and generate a projected visualization for a user.

Figure 3A:
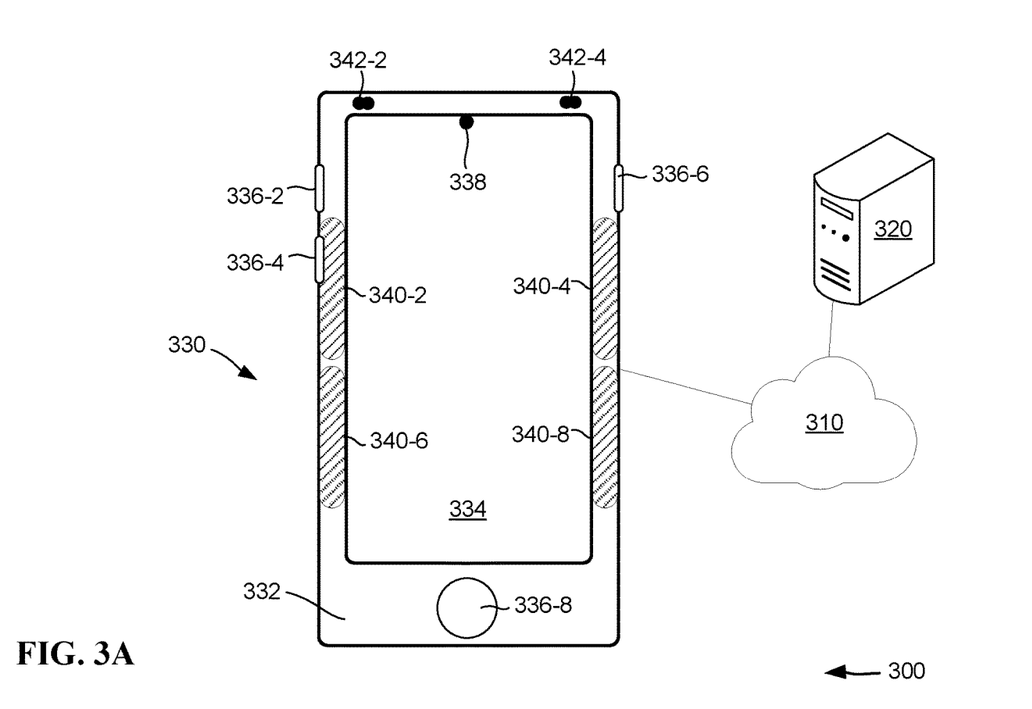
FIG. 3A depicts an overview of a system for providing an interface for interaction to a user, consistent with some embodiments of the disclosure.

FIG. 3A depicts an overview of a system 300 for providing an interface for interaction to a user, consistent with some embodiments of the disclosure. System 300 may include the following: a network 310 that facilitates communication with other components of the system; one or more servers 320 capable of performing certain processing and content delivery; and a mobile computing device ("MCD") 330.

The network 310 may be implemented using any number of any suitable physical and/or logical communications topologies. The network 310 can include one or more private or public computing networks. For example, network 310 may comprise a private network (e.g., a network with a firewall that blocks non-authorized external access) that is associated with the workload. Alternatively, or additionally, network 310 may comprise a public network, such as the Internet. Consequently, network 310 may form part of a packet-based network, such as a local area network, a wide-area network, and/or a global network such as the Internet. Network 310 can include one or more computer systems, networks, or databases, and can use one or more communication protocols to transfer data between the servers 320 and the MCD 330. Additionally, although illustrated in FIG. 3A as a single entity, in other examples network 310 may comprise a plurality of networks, such as a combination of public and/or private networks. The communications network 310 can include a variety of types of physical communication channels or "links." The links can be wired, wireless, optical, and/or any other suitable media. In addition, the communications network 310 can include a variety of network hardware and software for performing routing, switching, and other functions, such as routers, switches, base stations, bridges or any other equipment that may be useful to facilitate communicating data.

Servers 320 may be one or more computer systems including processing, input/output, and or memory. For example, server 320 may be a single computer system, such as computer 100. The servers 320 may be configured to perform one or more operations of PVI. Specifically, the servers 320 may be configured to identify one or more candidate computing actions of a user. The servers 320, may for example, execute a machine learning model, such as an instance of neural network 200, to identify an application or application icon to project to the user.

The MCD 330 may be a computing device configured to perform one or more operations. For example, MCD 330 may be a tablet or smartphone configured to perform one or more computing actions, such as browsing websites on the Internet, sending messages to other users, writing notes. The MCD 330 may include at least one or more of the following: an outer surface 332; a screen 334; one or more buttons 336-2, 336-4, 336-6, and 336-8 (collectively, 336); and an audiovisual receiver 338. The outer surface 332 may be made of a plastic, metal, composite, or other relevant material (e.g., aluminum). The outer surface 332 may be mostly rigid, or semi-rigid and configured to resist bending, scratching, or other impacts.

The screen 334 may be configured to display one or more icons, applications, or other relevant user interface elements. In detail, software executing on the MCD 330 may be displayed by the screen 334, including content and user interface elements. For example, the screen 334 may display a web browser, including an address bar, scroll bars, and webpage content received from one or more servers 320. The screen 334 may be a touchscreen configure to receive taps, touches, swipes, and other relevant touch-based input from a user. The buttons 336 may be physical buttons, such as mechanical switches or microswitches. The buttons 336 may be virtual buttons that do not actually move, such as capacitive sensing buttons.

The audiovisual receiver 338 may be configured to capture an environment in front of the MCD 330. Specifically, the audiovisual receiver 338 may be a camera configured to capture images of a user. For example, the audiovisual receiver 338 may be a color camera having a telephoto or normal field of view of approximately forty-eight degrees that can capture a full color image of a face, head, and shoulders of a user. In another example, the audiovisual receiver 338 may be a color camera having a super wide angle field of view of approximately one-hundred fifteen degrees that can capture a full color image of a user including the head, arms, and some of the torso of the user. The audiovisual receiver 338 may also include a microphone configured to capture and record sound of a user, such as talking or singing.

The MCD 330 may include other components configured to perform operations of PVI. Specifically, the MCD 330 may include at least the following: a plurality of grip sensors 340-2, 340-4, 340-6, 340-8 (collectively, 340); and one or more light sources 342-2 and 342-4 (collectively, 342). The grip sensors 340 may be integrated into or adjacent to the outer surface 332 of the MCD 330. The grip sensors 340 may be configured to measure or identify a grip of a user of the MCD 330. For example, the grip sensors 340 may be force, pressure, or mechanical sensors configure to detect and measure the pressure of fingers and/or thumbs. In another example, the grip sensors 340 may be capacitive sensors configured to sense the touch or physical contact of a digit of a user. The grip sensors 340 may operate as a long continuous strip along the sides of the MCD 330. In some embodiments, the grip sensors 340 may be separated and operate independently. For example, grip sensor 340-2 may sense a thumb of a left hand separately from grip sensor 340-6 sensing a palm of a left hand.

The light sources 342 may be configured to render or project one or more user interface elements that may otherwise be displayed on the screen. For example, each of the light sources 342 may be a projected light or series of lights having color and luminance values and configured to create projected images around the MCD 330. In another example, each of the light sources 342 may be a volumetric source configured to generate a three-dimensional projected interface or content in mid-air.

Figure 3B:
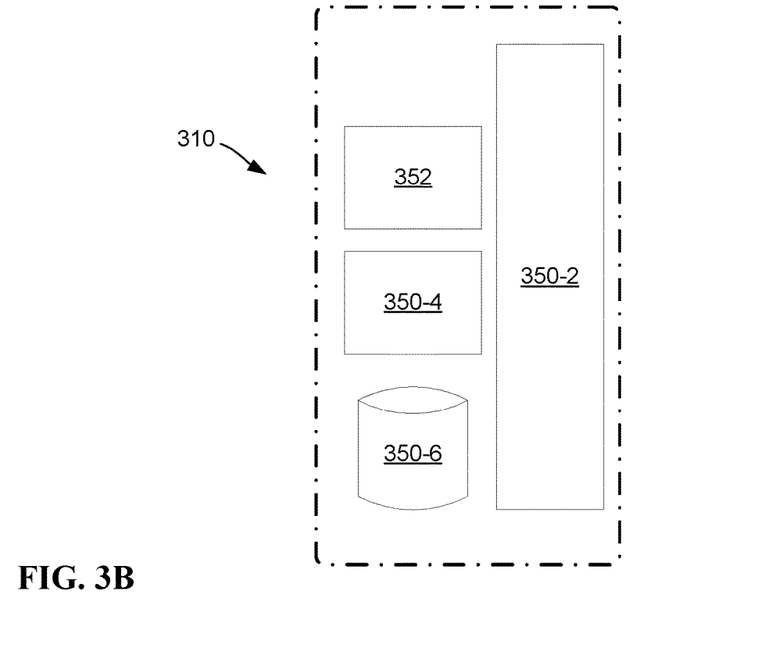
FIG. 3B depicts a view of one or more internal components of a mobile computing device of the system in FIG. 3A, consistent with some embodiments of the disclosure.

FIG. 3B depicts a view of one or more internal components of a mobile computing device 330 of the system 300 in FIG. 3A, consistent with some embodiments of the disclosure. MCD 330 may include at least the following internal components: a power source 350-2, a processor 350-4, and a memory 350-6 (collectively, internal components 350). The MCD 330 may be considered a computer system, such as computer 100 of FIG. 1. The power source 350-2 may be a lithium-ion battery, or other relevant portable power source. The processor 350-4 may be a microprocessor, such as an application specific or general purpose processor, system on a chip, or other computing device. The memory 350-6 may be random access memory, solid state memory, or some combination. The memory 350-6 may be configured to store profile and historical information (e.g., information about a user of the MCD 330, geographic information such as locations of the MCD 330, application usage information, or application placement and arrangement information). The memory 350-6 may also include other relevant computing software, such as an operating system and a set of one or more installed applications (e.g., calendar applications, online store applications, messaging applications, web-browsers, food and drink applications, etc.).

In some embodiments, MCD 330 may also include additional components specifically configured to perform PVI. Specifically, MCD 330 may include a projected interface engine ("PIE") 352 designed to generate interface elements for PVI. The PIE 352 may be a particular set of software algorithms, routines, utilities or operations that run via the internal components 350. For example, PIE 352 may be a routine that is loaded and executed by processor 350-4. The MCD 330 may include a specific hardware, such as a dedicated application specific integrated circuit configured to perform one or more operations on data related to the generation, suggestion, and placement of applications. For example, the internal components 350 and/or the PIE 352 may be configured to monitor the status of the MCD 330, such as what applications are being executed, and what input is being received from the screen 334, buttons 336, and camera 338. The MCD 330 may also be configured to identify a computing action of a user, such as the user viewing a first application of the set of installed applications. Based on monitoring the state of the MCD 330, a set of one or more candidate computing actions may be determined. In response to identifying a current computing action of a user, the set of one or more candidate computing actions may also be determined. For example, in response to a specific time of day, a set of candidate computing actions may be determined that include checking email, viewing a calendar, or the like. In another example, in response to a user using a first app on the MCD 330, a set of candidate computing actions may be determined that include a related second app, a frequently used second app, and the like.

In some embodiments, the internal components 350 and/or the PIE 352 may be configured to execute a machine learning model or perform a machine learning technique, or one or more instances of a neural network, such as neural network 200. For instance, processor 350-4 may, in some embodiments, execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The internal components 350 and/or the PIE 352 may operate to perform the machine learning model and determine, based on the machine learning model, various PVI operations. For instance, the PIE 352 may determine a set of candidate computing actions by a machine learning model configured to determine the set of candidate computing actions of the user (e.g., through an instance of neural network 200). The machine learning model may be based on historical learning. The historical learning may include information from past usage patterns of MCD 330 or from a profile of a user of MCD 330. For example, the historical learning may be related to one or more geographic locations of the MCD 330. The MCD 330 may be located at a coffee shop based on global position system ("GPS") signals, and the GPS signals may be recorded in the memory 350-6. The historical learning may include information from past application usage patterns of the set of installed applications. For example, a profile of application usage may be generated and stored in the memory 350-6; the profile may be used by the machine learning model to determine, a current state of the MCD 330, as well as candidate computing actions.

Figure 3C:
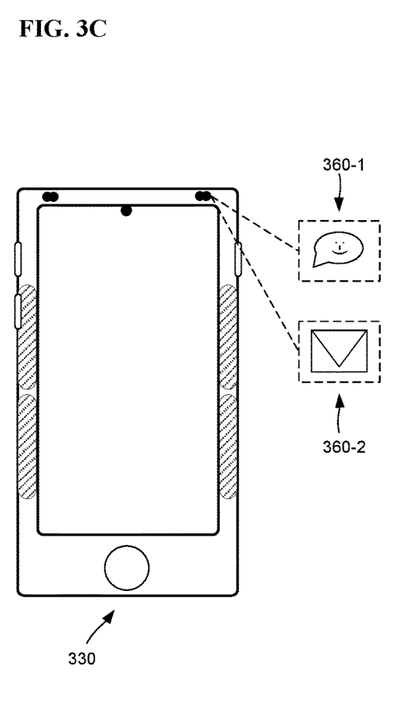
FIG. 3C depicts a first operating state of a mobile computing device of the system in FIG. 3A, consistent with some embodiments of the disclosure.
Figure 3D:
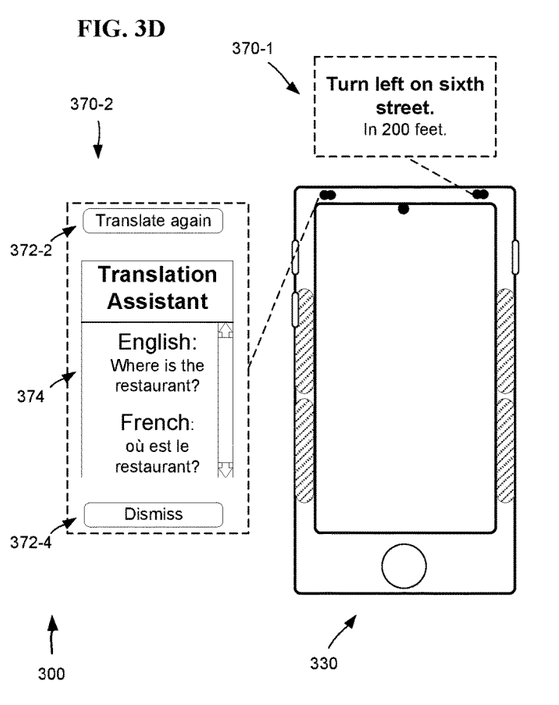
FIG. 3D depicts a second operating state of a mobile computing device of the system in FIG. 3A, consistent with some embodiments of the disclosure.
Figure 3E:
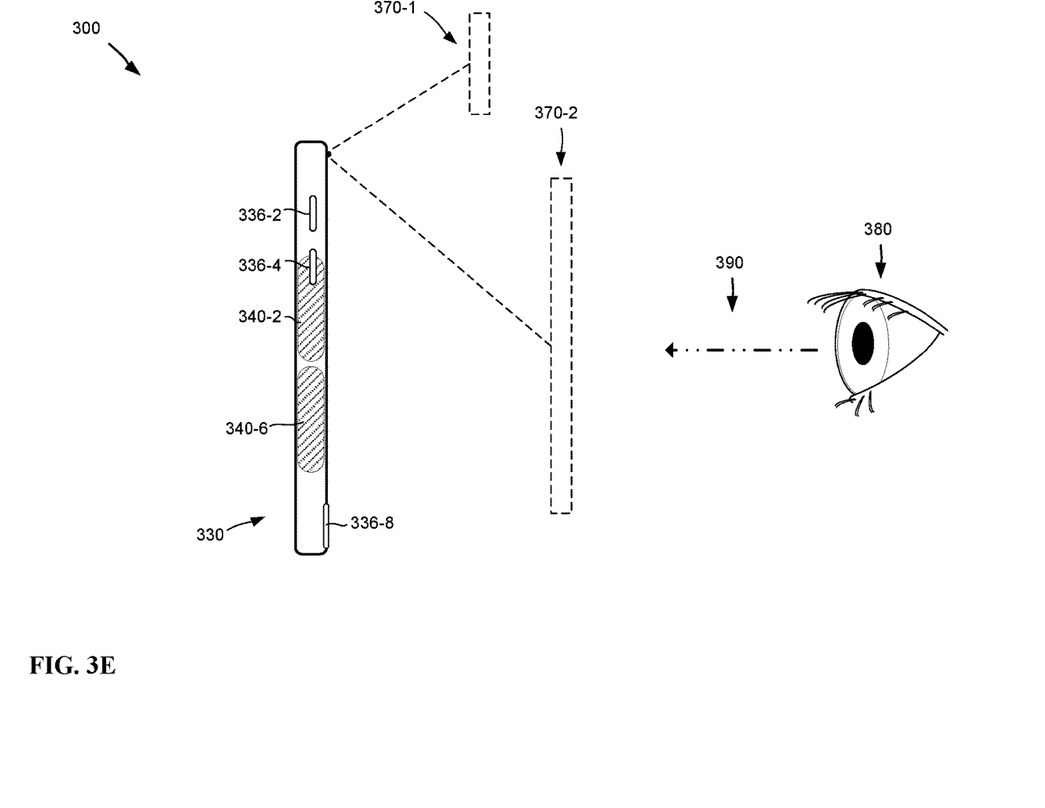
FIG. 3E depicts a second view of the second operating state of the system in FIG. 3D, consistent with some embodiments of the disclosure.

FIGS. 3C, 3D, and 3E depict possible operating states of the mobile computing device 330 based on PVI operation consistent with some embodiments of the disclosure. The system 300 may operate based on one or more factors or conditions in providing the various operating states. For example, based on how a user grips the MCD 330, the grip sensors 340 may determine a gripping pattern of the MCD. Based on the gripping pattern of the MCD 330, the PVI may determine the best manner to display various user interface elements of a projected GUI in mid-air around the MCD. The avoidance of a grip, such that the projected GUI does not interfere with a user's hands, may increase the ability of a user to interact with the projected user interface elements. The grip sensors may also increase or facilitate comfortability in how a user operates and interacts with the projected interface.

In some embodiments, the projected GUI may be located near to one or more digits, based on readings from the grip sensors 340, and may facilitate comfortable interaction with a projected GUI. For example, based on a grip, a location in the area around the outer surface 332 of the MCD 330 may be selected to project a GUI to facilitate reachability to gesture at the projected GUI. The invocation placement and timing of PVI may be based on any of the following: an app contextual need, an app required aspect ratio, common holding pattern and/or grip, particular app or feature in the app (e.g., scroll bars, buttons), user demographics (e.g., right-handed or left-handed usage scenarios), and the like. In some embodiments, the placement and invocation timing may use a machine learning model and may consider historical learning based on past usage (e.g., a first app is always used before a second app in a short period of time), past app arrangements (e.g., a first app is used to the left of a second app), past locations (e.g., a particular app is used in a workplace), and/or app relationships (e.g., an app is often used at a certain place).

FIG. 3C depicts a first operating state of a mobile computing device 330 of the system 300 in FIG. 3A, consistent with some embodiments of the disclosure. During the first operating state, one or more first projected visualizations 360-1 and 360-2 (collectively projected visualizations 360) may be generated system 300. Specifically, the first projected visualizations 360 may be generated by the light sources 342. The first projected visualizations 360 may be located around but separate from the outer surface 332 of the MCD 330. For example, the first projected visualizations 360 may be a few millimeters to a couple centimeters away from the MCD 330.

The first projected visualizations 360 may facilitate increased usage and performance of computing operations of a MCD 330. Specifically, the screen 334 of the MCD 330 may display a first application (not depicted) as a current state, and a user may interact through the screen 334 as a computing action. The system 300 may perform PVI by determining a subset of the set of installed applications that may be candidate computing actions for performing operations of the MCD 330. The first projected visualizations 360 may represent multitasking initiations for performing additional applications. For example, the first projected visualization 360-1 may be an icon corresponding to a messaging application. In a second example, the first projected visualization 360-2 may be an icon corresponding to an email application.

The first projected visualizations 360 may be interacted with by a user. For example, the audiovisual receiver 338 may monitor gestures of hands, fingers, or other relevant parts of a user. The audiovisual receiver 338 may capture movement in the mid-air that is around the outer surface 332. The MCD 330 and/or the remote servers 320 may determine, based on photogrammetry, laser-based distance detection, or other relevant three-dimensional and/or two-dimensional image processing, a location of a hand or other relevant part of a user. The system 300 may determine a gesture or interaction with the first projected visualizations 360, such as an intent to touch the first projected visualization 360-1, and correspondingly, launch a messaging application.

FIG. 3D depicts a second operating state of a mobile computing device 330 of the system 300 in FIG. 3A, consistent with some embodiments of the disclosure. During the first operating state, one or more second projected visualizations 370-1 and 370-2 (collectively projected visualizations 370) may be generated by system 300. Specifically, the second projected visualizations 370 may be generated by the light sources 342. The second projected visualizations 370 may be located around but separate from the outer surface 332 of the MCD 330. For example, the second projected visualizations 370 may be a few millimeters to a couple centimeters away from the MCD 330.

The second visualizations 370 may facilitate multitasking by displaying additional applications without interrupting or disturbing a user. Specifically, the second visualizations 370 may be rendered or projected away from the view or field of view of a user that is viewing the screen 334 of the MCD 330. For example, second visualization 370-1 may be a projection of a window of a navigation application that is displayed 0.75 centimeters above the top of the MCD 330. In a second example, second visualization 370-2 may be a projection of a window of a translation application that is displayed 1.1 centimeters to the left of the MCD 330. The location of the second visualizations 370 may not block a view or intersect with or impede a user's gaze, view, look, or eyesight that is directed at the MCD 330 (and the screen 334 of the MCD). This separation or distance between the projected visualizations of the system 300 may facilitate the usage consumption and viewing of multiple applications simultaneously, and without having to split, reduce, or diminish the content on the screen 334. The second visualizations 370 may be selected and provided to the user based on one or more of the following: the location of the MCD 330 being away from a routine area (e.g., a vacation or travel), and the screen 334 of the MCD 330 displaying a restaurant review website.

A user may interact with the second visualizations 370 through various commands, such as bodily gestures or verbal commands to manipulate the second visualizations. The manipulation may include manipulating the position of a particular visualization (e.g., pinching or dragging the second visualization 370-1 from above the mobile computing device to one of the sides). The manipulation may include manipulating the size of a particular visualization (e.g., extending or collapsing the height or width of second visualization 370-2). The manipulation can include dismissing various visualizations (e.g., closing either or both of the second visualizations 370). The manipulations can include manipulating certain portions of the various visualizations. For example, second visualization 370-2 may include two interactive interfaces 372-2 and 372-4 (collectively, interactive interface 372) and a content element 374. The system 300 may operate by monitoring gestures or other interactions directed to the interactive interfaces 372, such as a point or gesture towards interactive interface 372-2. The various manipulations may be recorded in the memory 350-6 and used by PVI to perform historical learning. The future placement and positioning may be based on the historical learning.

In some embodiments, based on the priority, confidentiality, and ease of interacting of the contents in different mobile app, the system 300 may swap the projection and the rendering of various apps. For example, a first application that may be displayed on screen 334 is a static review page. The static review page may have a lower level of interactivity than other apps. Specifically, the first application may have a lower level of interactivity than a second application that is an interactive translation application projected to second visualization 370-2. Based on the level of interactivity of the first application versus that of the second application, the MCD 330, may swap the destination rendering of the first application and the second application. Specifically, the MCD 330 may start rendering on the display 334 the second application, and also start projecting the first application to the second visualization 370-2.

While interacting with the opened app on the mobile phone display and in mid-air, the user may perform a gesture to adjust the position of the mobile app contents, that includes accommodating multiple apps on physical display, different sides or mid-air layers of mobile phone, etc., and the same can be used for safe learning to adjust the mobile app opened contents.

FIG. 3E depicts a second view of the second operating state of the system 300 in FIG. 3D, consistent with some embodiments of the disclosure. The second view may be a side view from the left side of MCD 330 as the second visualizations 370 are being projected into mid-air. The second view may also depict a representation of a user 380, and a gaze 390 of the user towards the MCD 330; the gaze may be the view or a path that includes the field of view of the user. The area around the MCD 330 where the second visualizations 370 are projected may be closer than the MCD 330 to the user 380. Specifically, the second visualization 370-1 and the second visualization 370-2 may be located along the path of the gaze 390 on different layers. While the different layers may be between the MCD 330 and the user 380, the placement of the second visualizations may not block or disturb the gaze 390 to the MCD. For example, from the viewpoint of the user 380 may include being able to simultaneously view the screen 334, the second projected visualization 370-1, and the second visualization 370-2 without any overlapping, blocking, or obscuring.

Figure 4:
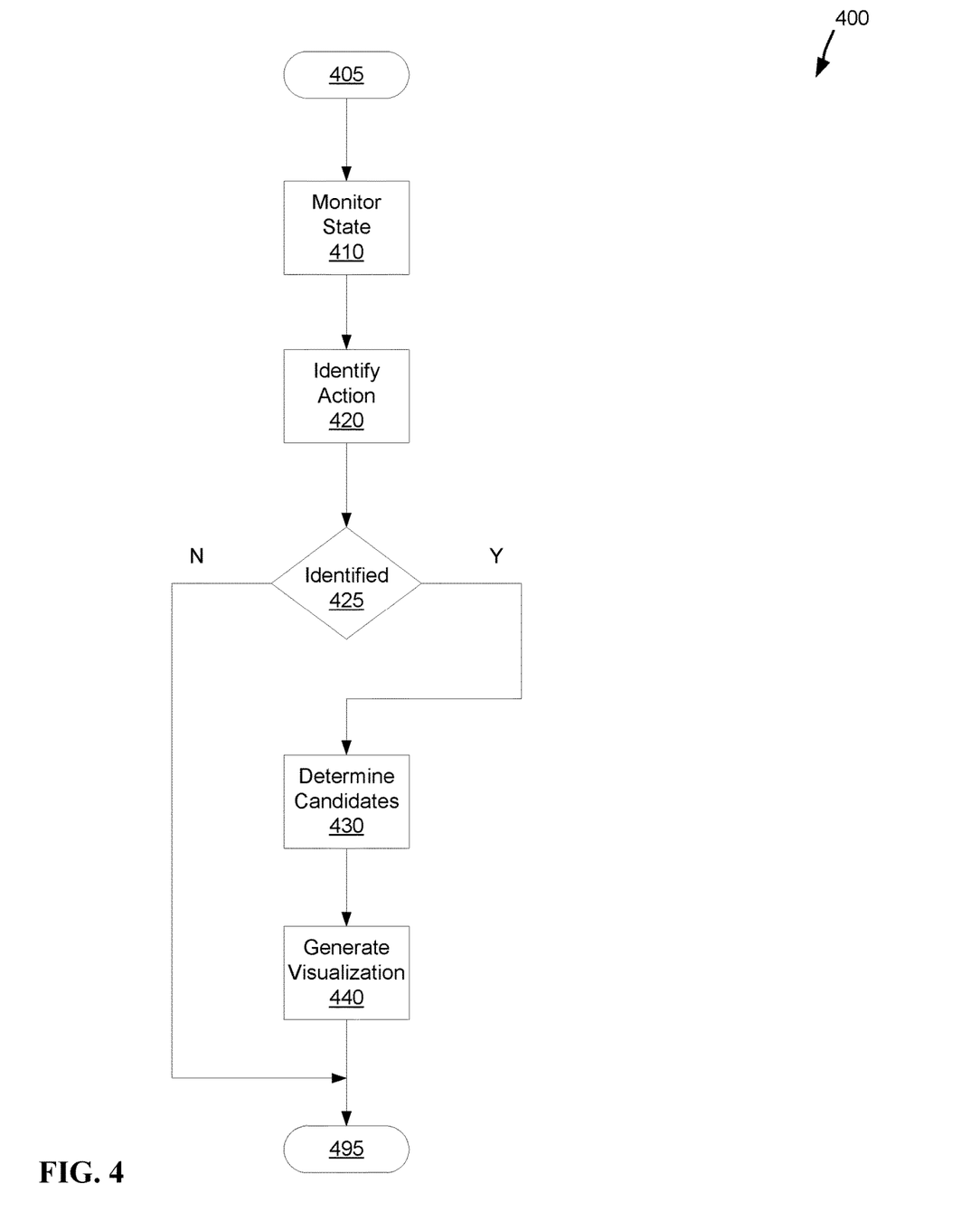
FIG. 4 depicts a method of performing projected visual interaction, consistent with some embodiments of the disclosure.

FIG. 4 depicts a method 400 of performing projected visual interaction, consistent with some embodiments of the disclosure. Method 400 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). In another example, method 400 may be performed by computer 100 of FIG. 1. In yet another example, method 400 may be performed by system 300 of FIGS. 3A, 3B, 3C, 3D, and 3E.

Method 400 may begin at 405 and proceed with monitoring the state of a mobile computing device at 410. The MCD may be a smartphone, tablet computer, laptop, or other computing device (e.g., MCD 430). The monitoring of the MCD may include monitoring the type of applications that are being used, the location of the MCD, and other parameters. For example, the MCD may include a set of installed applications, such as web browsers, e-mail programs, utilities, online store applications, and the monitoring may include recording the times of launching and usage patterns of each of the applications. The monitoring may include monitoring the category of applications and related usage, such as the usage of media consumption applications in the morning. The monitoring may include monitoring the location of the MCD, such as the usage of communication applications while at a coffee shop.

The MCD may be configured to perform historical learning as part of the monitoring. Specifically, a machine learning model or other artificial intelligence construct (e.g., an instance of neural network 200) may be executed against the monitored data to determine relationships and patterns, such as certain applications are used at certain locations or certain applications are used right before or after certain other applications. The historical learning may include generating a profile or knowledge corpus that includes triggers, events, or relationships between certain parameters of the MCD, application usage patterns, location information, and the like.

The monitoring may occur over a long or extended period of time. For example, the monitoring at 410 may occur over a period of weeks and may include operation of method 400 continuously and/or repeatedly. The monitoring, at 410, may include monitoring the current state of the mobile computing device.

At 420 a first computing action may be identified. The first computing action may be an action of a user while using the mobile computing device. The first computing action may be identified based on the current state of the mobile computing device, monitored at 410. The first computing action may be the launch of, or continued execution of a first application of the set of installed applications. The first computing action may be switching from a first application to a second application.

If a first computing action is identified, at 425:Y, then one or more candidate actions may be determined at 430. The candidate actions may include other applications that may be useful to be launched or executed. The candidate actions may be determined or selected based on the knowledge corpus and based on the historical learning. For example, if a particular computing action is identified (at 420) as a currently displayed application, information about that application may be processed to determine any type of relationship to other installed application. The relationship could be past interaction between the currently displayed application and other application usage. The relationship could be past application usage in relation to a geographic location and other applications and a current computing action that is identified to the same geographic location. The relationship could be past application usage of both the currently displayed application and other applications of a similar category.

The determination of the candidate actions may also include ranking of the candidate actions. For example, and based on historical learning and/or profile information, the determined candidate actions may be scored based on various factors, including any of the following: assigning points to applications that are more frequently used with the currently displayed application; assigning points to applications that are a similar category to the currently displayed application; assigning points to applications that were previously used at the current geographic location. The candidate computing actions may be sorted based on the ranking, such that candidate computing actions with more points may be prioritized above candidate computing actions having less points.

At 440, a projected visualization may be generated. The projected visualization may include one of the candidate computing actions, such as a first application. The first application may be projected near the mobile computing device, such as in mid-air in the region around the MCD. The projected visualization may include multiple candidate computing applications, such as two, three, or more applications projected around the mobile computing device. The project visualization may only include a subset of the candidate computing actions, such as the candidate computing actions having a higher ranking or the highest ranked candidate computing action being projected. The projection may be in the form of one or more application shortcuts or initiations; the shortcuts may be in the form of a graphical representation or icon. The projection may be in the form of an application, such as an application window.

If a first computing action is not identified, at 425:N, or after a projected visualization is generated at 440, method 400 may end at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
monitoring, by a mobile computing device, a current state of the mobile computing device, wherein the mobile computing device has a set of one or more installed applications, wherein the current state is related to the set of installed applications;
identifying, in response to the current state, a first computing action of a user of the mobile computing device, wherein the first computing action is related to the set of installed applications;
determining, in response to the first computing action, a set of one or more candidate computing actions; and
generating, by the mobile computing device and based on the first computing action, a projected visualization that relates to a first candidate computing action of the set of candidate computing actions;
wherein:
the mobile computing device includes an outer surface;
the mobile computing device includes a screen integrally coupled to the outer surface;
the projected visualization is located distal from the outer surface of the mobile computing device;
the current state of the mobile computing device is a first application of the set of installed applications is displayed by the screen;
the candidate computing actions includes a set of one or more additional applications to be provided to the user; and
the set of additional applications is a subset of the set of installed applications; and
the projected visualization includes a second application;
the method further comprising:
monitoring a second current state of the mobile computing device, wherein the second current state occurs after the current state and during the projected visualization that includes the second application;
determining, in response to the second current state, an application priority of the first application and the second application;
updating, in response to the application priority, the screen to include the second application; and
updating, in response to the application priority, the projected visualization to include the first application.

2. The method of claim 1, wherein the determining a set of candidate computing actions further comprises:
determining, by a machine learning model, the set of candidate computing actions of the user, wherein the machine learning model is based on historical learning.

3. The method of claim 2, wherein the historical learning is related to one or more geographic locations of the mobile computing device.

4. The method of claim 2, wherein the historical learning is related to application usage patterns of the set of installed applications.

5. The method of claim 1, wherein:
a view of the user forms a path between the user and the screen of the mobile computing device, and
the projected visualization is not located in the path between the user and the screen.

6. The method of claim 1, wherein the projected visualization does not cause an update to the screen of the mobile computing device.

7. The method of claim 1, wherein the projected visualization includes an icon that represents the first candidate computing action.

8. The method of claim 7, wherein the projected visualization includes a plurality of icons that represent one or more candidate computing actions of the set of candidate computing actions.

9. The method of claim 1, wherein:
the application priority includes a first interaction level of the first application and a second interaction level of the second application, and
the second interaction level is greater than the first interaction level.

10. The method of claim 1, wherein the application priority includes an application category of one or more applications of the set of installed applications.

11. The method of claim 1, wherein the projected visualization is generated based on a grip of the user.

12. The method of claim 1, wherein the method further comprises:
detecting, by a sensor of the mobile computing device, a user interaction of the user;
determining, based on the user interaction, an intention to interact with the projected visualization; and
updating, by the mobile computing device, the projected visualization.

13. The method of claim 12, wherein the sensor is a capacitive sensor, and wherein the user interaction is touch input of the user.

14. The method of claim 12, wherein the sensor is an image sensor, and wherein the intention to interact includes visual data of the user.

15. A system, the system comprising:
a memory, the memory containing one or more instructions; and
a processor, the processor communicatively coupled to the memory, the processor, in response to reading the one or more instructions, configured to:
monitor, by a mobile computing device, a current state of the mobile computing device, wherein the mobile computing device has a set of one or more installed applications, wherein the current state is related to the set of installed applications;
identify, in response to the current state, a first computing action of a user of the mobile computing device, wherein the first computing action is related to the set of installed applications;
determine, in response to the first computing action, a set of one or more candidate computing actions; and
generate, by the mobile computing device and based on the first computing action, a projected visualization that relates to a first candidate computing action of the set of candidate computing actions;
wherein:
the mobile computing device includes an outer surface;
the mobile computing device includes a screen integrally coupled to the outer surface;
the projected visualization is located distal from the outer surface of the mobile computing device;
the current state of the mobile computing device is a first application of the set of installed applications is displayed by the screen;
the candidate computing actions includes a set of one or more additional applications to be provided to the user; and
the set of additional applications is a subset of the set of installed applications; and
the projected visualization includes a second application;
the processor being further configured to:
monitor a second current state of the mobile computing device, wherein the second current state occurs after the current state and during the projected visualization that includes the second application;
determine, in response to the second current state, an application priority of the first application and the second application;
update, in response to the application priority, the screen to include the second application; and
update, in response to the application priority, the projected visualization to include the first application.

16. A computer program product, the computer program product comprising:
one or more computer readable storage media; and
program instructions collectively stored on the one or more computer readable storage media, the program instructions configured to cause a processor to:
monitor, by a mobile computing device, a current state of the mobile computing device, wherein the mobile computing device has a set of one or more installed applications, wherein the current state is related to the set of installed applications;
identify, in response to the current state, a first computing action of a user of the mobile computing device, wherein the first computing action is related to the set of installed applications;
determine, in response to the first computing action, a set of one or more candidate computing actions; and
generate, by the mobile computing device and based on the first computing action, a projected visualization that relates to a first candidate computing action of the set of candidate computing actions;
wherein:
the mobile computing device includes an outer surface;
the mobile computing device includes a screen integrally coupled to the outer surface;
the projected visualization is located distal from the outer surface of the mobile computing device;
the current state of the mobile computing device is a first application of the set of installed applications is displayed by the screen;
the candidate computing actions includes a set of one or more additional applications to be provided to the user; and
the set of additional applications is a subset of the set of installed applications; and
the projected visualization includes a second application;
the program instructions being further configured to cause the processor to:
monitor a second current state of the mobile computing device, wherein the second current state occurs after the current state and during the projected visualization that includes the second application;
determine, in response to the second current state, an application priority of the first application and the second application;
update, in response to the application priority, the screen to include the second application; and
update, in response to the application priority, the projected visualization to include the first application.

* * * * *